(12) United States Patent
Wisnia et al.

(10) Patent No.: US 11,750,732 B1
(45) Date of Patent: Sep. 5, 2023

(54) SYSTEM FOR INTRODUCING FEATURES TO AN IN-VEHICLE INFOTAINMENT SYSTEM AND METHOD OF USE THEREOF

(71) Applicants: Jack Wisnia, Dollard-des Ormeaux (CA); Feng Du, Kirkland (CA)

(72) Inventors: Jack Wisnia, Dollard-des Ormeaux (CA); Feng Du, Kirkland (CA)

(73) Assignee: 14788591 Canada Inc., Dollard-des-Ormeaux (CA)

( * ) Notice: Subject to any disclaimer, the term of this patent is extended or adjusted under 35 U.S.C. 154(b) by 0 days.

(21) Appl. No.: 18/171,535

(22) Filed: Feb. 20, 2023

(51) Int. Cl.
| | |
|---|---|
| *H04M 1/00* | (2006.01) |
| *H04M 1/72409* | (2021.01) |
| *H04M 1/72427* | (2021.01) |
| *H04N 7/18* | (2006.01) |

(52) U.S. Cl.
CPC . *H04M 1/724098* (2022.02); *H04M 1/72427* (2021.01); *H04N 7/185* (2013.01)

(58) Field of Classification Search
CPC ........ H04M 1/724098; H04M 1/72427; H04N 7/185
See application file for complete search history.

(56) References Cited

U.S. PATENT DOCUMENTS

| | | | |
|---|---|---|---|
| 7,739,494 B1 | 6/2010 | McCorkendale et al. | |
| 9,900,161 B2 | 2/2018 | Sun et al. | |
| 2015/0244711 A1 * | 8/2015 | Venkataraman | .... H04L 63/0815 713/168 |

(Continued)

FOREIGN PATENT DOCUMENTS

| | | |
|---|---|---|
| CN | 104156638 A | 11/2014 |
| CN | 105354496 A | 2/2016 |

(Continued)

OTHER PUBLICATIONS

Zachary Wander, "How to install apps for Android Auto that Google hasn't approved". Published May 7, 2021. Retrieved on Jan. 16, 2023 at the link: https://www.xda-developers.com/install-unapproved-apps-for-android-auto/.

(Continued)

*Primary Examiner* — Pakee Fang

(57) ABSTRACT

A computing device operating on a Linux or Android platform for adding features to an in-vehicle infotainment system of a vehicle; it has an input/output interface; a power source input; a processor; and memory storing program code that, when executed by the processor, causes the processor to receive an Android-based smartphone infotainment application program; scan program code of the Android-based smartphone infotainment application program using a predefined pattern to locate a base certificate in the program code of the Android-based smartphone infotainment application program; generate a certificate-key pair from the base certificate; transmit the certificate of the certificate-key pair to the infotainment system for authentication and to enable communication with an Android protocol between the computing device and the infotainment system; and cause a display of information associated with a feature application program for display on the infotainment system; methods of use thereof.

17 Claims, 5 Drawing Sheets

(56) References Cited

U.S. PATENT DOCUMENTS

| | | | | |
|---|---|---|---|---|
| 2015/0373479 | A1* | 12/2015 | Xia | H04M 1/6091 |
| | | | | 455/420 |
| 2018/0026949 | A1* | 1/2018 | Kimn | H04L 9/0827 |
| | | | | 713/156 |
| 2018/0359103 | A1* | 12/2018 | Geupel | H04L 9/3273 |
| 2020/0169422 | A1* | 5/2020 | Ingraham | H04L 9/085 |

FOREIGN PATENT DOCUMENTS

| | | |
|---|---|---|
| CN | 105873044 A | 8/2016 |
| CN | 106203110 A | 12/2016 |
| CN | 106209379 A | 12/2016 |
| CN | 106656513 A | 5/2017 |
| CN | 111814136 A | 10/2020 |
| WO | 2014/010847 A1 | 1/2014 |

OTHER PUBLICATIONS

AAAD. Shmykelsa. Version 1.4.4, Apr. 7, 2022. Retrieved on Jan. 16, 2023 at the link: https://github.com/shmykelsa/AAAD.

AAAD ,.Shmykelsa Source code version 1.3, May 12, 2021 Retrieved on Jan. 16, 2023 at the link: https://github.com/shmykelsa/AAAD/tree/main/app/src/main.

CERT Keyfinder. Nov. 7, 2022. Retrieved on Jan. 16, 2023 at the link: https://github.com/CERTCC/keyfinder.

Android Auto Client-Server (AACS). May 31, 2022. Retrieved on Jan. 16, 2023 at the link: https://github.com/tomasz-grobelny/AACS.

AACS/AAClient/src/AaCommunicator.cpp. Mar. 21, 2021. Retrieved on Jan. 16, 2023 at the link: https://github.com/tomasz-grobelny/AACS/blob/faa1cf208feb5dfe1cb9535be16daeac4f08da0c/AAClient/src/AaCommunicator.cpp#L207.

Tomasz Grobelny. How to hack Android Auto to display custom content. Dec. 17, 2020.Retrieved on Jan. 16, 2023 at the link: https://opensource.com/article/20/12/android-auto-open-source.

Felipe Lima, Bypassing Certificate Pinning on Android for fun and profit. Mar. 5, 2016. Retrieved on Jan. 16, 2023 at the link: https://medium.com/@felipecsl/bypassing-certificate-pinning-on-android-for-fun-and-profit-1b0d14beab2b.

Cody Wass. Four Ways to Bypass Android SSL Verification and Certificate Pinning. Jan. 9, 2018. Retrieved on Jan. 16, 2023 at the link: https://www.netspi.com/blog/technical/mobile-application-penetration-testing/four-ways-bypass-android-ssl-verification-certificate-pinning/.

Darlene Storm, Your Android has a Fake ID problem, allowing malware to impersonate trusted apps. Jul. 30, 2014. Retrieved on Jan. 16, 2023 at the link: https://www.computerworld.com/article/2476573/your-android-has-a-fake-id-problem--allowing-malware-to-impersonate-trusted-.html.

Maciej Markiewicz. 3 Ways How to Implement Certificate Pinning on Android. May 29, 2019. Retrieved on Jan. 16, 2023 at the link: https://www.netguru.com/blog/3-ways-how-to-implement-certificate-pinning-on-android.

How to extract Android version 3 signing certificate from the APK. Retrieved on Jan. 16, 2023 at the link: https://stackoverflow.com/questions/58136626/how-to-extract-android-version-3-signing-certificate-from-the-apk.

PlaystoreDownloader. A command line tool to download Android applications directly from the Google Play Store. Nov. 6, 2022. Retrieved on Jan. 16, 2023 at the link: https://github.com/ClaudiuGeorgiu/PlaystoreDownloader.

What Is an APK File and How to Open It [APK Opener Tools]. Retrieved on Jan. 16, 2023 at the link: https://www.softwaretestinghelp.com/how-to-open-apk-file/amp/.

Export Certificates and Private Key from a PKCS#12 File with OpenSSL. Retrieved on Jan. 16, 2023 at the link: https://www.ssl.com/how-to/export-certificates-private-key-from-pkcs12-file-with-openssl/amp/.

Extract PEM Public Key from X.509 Certificate. Retrieved on Jan. 16, 2023 at the link: https://stackoverflow.com/questions/29049267/extract-pem-public-key-from-x-509-certificate.

Bill Budington. Mobile MitM: Intercepting Your Android App Traffic on the Go. Apr. 18, 2022. Retrieved on Jan. 16, 2023 at the link: https://www.eff.org/deeplinks/2022/04/mobile-mitm-intercepting-your-android-app-traffic-go.

* cited by examiner

SYSTEM FOR INTRODUCING FEATURES TO AN IN-VEHICLE INFOTAINMENT SYSTEM AND METHOD OF USE THEREOF

TECHNICAL FIELD

The present disclosure relates to vehicles, and more particularly to a vehicle's in-vehicle infotainment system.

BACKGROUND

In-vehicle infotainment systems, providing a user with both information and entertainment, occupy traditionally at least the dashboard of the vehicle. In some infotainment systems, the system enables the display and interaction with certain application programs that are proprietary of or supported by Apple™ or Android™ or Linux™ devices. The infotainment system may have stored thereon these application programs, gain access to the application programs through an Internet connection to a remote server or through a connection with a smartphone device of the user that is in proximity to the vehicle.

However, the vehicle infotainment system is afflicted with certain limitations. For instance, the application programs that are compatible with infotainment systems or application programs running on the infotainment system for mirroring a mobile device (such as Android Auto™) may be limited. In some cases, these limitations are imposed by the software developer of the application program used to mirroring a mobile device on the infotainment system. For instance, in the example Android Auto™, Google selects, through a plurality of conditions and permissions, the application programs that are supported by Android Auto™, and as a result, accessible via the infotainment system that is running Android Auto™.

It would be advantageous to augment the kinds of features made available for use using a vehicle's infotainment system, thereby improving the user's experience with the vehicle's infotainment system.

SUMMARY

The present disclosure relates to systems, devices and methods for introducing features to an in-vehicle infotainment system, preferably that were not previously available via the in-vehicle infotainment system. These features are to give the infotainment system added functionality. For instance, the systems and methods described herein may enable display of application programs that were not permitted for display or supported by the software developer of the application program running on the infotainment system used to mirror a mobile device. In some instances, the systems and methods may permit the infotainment system to display information generated by external devices that are connected or connectable to the present system, such as an external camera, a data-bus receiving readings from the vehicle, etc.

The infotainment system of the present application runs an Android-based smartphone infotainment application program, such as Android Auto™, for causing a display or mirroring of features of an Android device or Linux device. The communication between the feature-introducing Android or Linux device of the present disclosure and the infotainment system is performed using an Android protocol.

The system of the present disclosure retrieves the necessary credentials to interface with the infotainment system running the Android-based smartphone infotainment application program. These credentials are obtained by receiving (e.g. downloading) an Android-based smartphone infotainment application program (e.g. Android Auto™). In some instances, the latest version of the Android-based smartphone infotainment application program is received. The program code of the Android-based smartphone infotainment application program is scanned using a predetermined pattern to locate a base certificate located therein.

A series of transformations (or performance of a function) is made to the base certificate in order to generate a corresponding Android protocol certificate and a private key.

A broad aspect is an Android- or Linux-based computing device for introducing features to an in-vehicle infotainment system of a vehicle, the introduced features accessible by a user on the infotainment system. The device includes an input/output interface for communicating with the in-vehicle infotainment system; a power source input; a processor; and memory storing program code that, when executed by the processor, causes the processor to: receive an Android-based smartphone infotainment application program; scan program code of the Android-based smartphone infotainment application program using a predefined pattern to locate a base certificate in the program code of the Android-based smartphone infotainment application program; generate a certificate-key pair from the base certificate; transmit the certificate of the certificate-key pair to the infotainment system for authentication and to establish communication with an Android protocol between the computing device and the infotainment system; and cause a display of information associated with a feature application program for display on the infotainment system.

In some embodiments, the input/output interface may establish a wired connection with the in-vehicle infotainment system.

In some embodiments, the input/output interface may be a USB port.

In some embodiments, the power source input may be configured to receive power from the vehicle.

In some embodiments, the device may include a power source that is a battery, wherein the power source input receives power from the battery.

In some embodiments, the memory may further store program code for causing the processor to run the feature application program that is a videogame.

In some embodiments, the feature application program may be a first feature application program, and wherein the memory may further store program code for causing the processor to run a second feature application program, wherein the memory further includes program code for causing the processor, when executing the program code, to: receive, via the input/output interface, touch input position information received on a display of the infotainment system; and correlate the received touch input position information with one of: target position information of the first feature application program; and target position information of the second feature application program, to identify a selected feature application program, and wherein the causing a display of information is of the selected feature application program.

In some embodiments, the device may include a data port configured to receive data from the vehicle, wherein the causing a display of information associated with a feature application program may be related to the received data from the vehicle.

In some embodiments, the device may include a camera, wherein the causing a display of information associated with a feature application program may include an image stream received from the camera.

In some embodiments, the program code may further cause the processor, when executing the program code, to cause the receiving, scanning, generating and transmitting to be repeated periodically.

In some embodiments, the device may include a user input interface.

Another broad aspect is a method of introducing features to an in-vehicle infotainment system of a vehicle, the introduced features accessible by a user on the infotainment system. The method includes receiving an Android-based smartphone infotainment application program; scanning program code of the Android-based smartphone infotainment application program using a predefined pattern to locate a base certificate in the program code of the Android-based smartphone infotainment application program; generating a certificate-key pair from the base certificate; transmitting the certificate of the certificate-key pair to the infotainment system for authentication and to establish communication with an Android protocol between the computing device and the infotainment system; and causing a display of information associated with a feature application program for display on the infotainment system.

In some embodiments, the feature application program may be a videogame.

In some embodiments, the feature application program may be a first feature application program, wherein the method may include receiving, via the input/output interface, touch input position information received on a display of the infotainment system; and correlating the received touch input position information with one of: target position information of the first feature application program; and target position information of a second feature application program, to identify a selected feature application program, and wherein the causing a display of information is of the selected feature application program.

In some embodiments, the causing a display of information associated with a feature application program may be related to received data from the vehicle.

In some embodiments, the causing a display of information associated with a feature application program may include an image stream received from a camera.

In some embodiments, the receiving, the scanning, the generating and the transmitting may be repeated periodically.

Another broad aspect is a non-transitory computer-readable medium having stored thereon program instructions for introducing features to an in-vehicle infotainment system of a vehicle, the introduced features accessible by a user on the infotainment system, the program instructions executable by a processing unit for receiving an Android-based smartphone infotainment application program; scanning program code of the Android-based smartphone infotainment application program using a predefined pattern to locate a base certificate in the program code of the Android-based smartphone infotainment application program; generating a certificate-key pair from the base certificate; transmitting the certificate of the certificate-key pair to the infotainment system for authentication and to establish communication with an Android protocol between the computing device and the infotainment system; and causing a display of information associated with a feature application program for display on the infotainment system.

In some embodiments, the program instructions may be further executable by the processing unit for running the feature application program that is a videogame.

In some embodiments, the program instructions may be further executable by the processing unit for: receiving, via the input/output interface, touch input position information received on a display of the infotainment system; and correlating the received touch input position information with one of: target position information of the first feature application program; and target position information of a second feature application program, to identify a selected feature application program, and wherein the causing a display of information is of the selected feature application program.

In some embodiments, the causing a display of information associated with a feature application program may be related to received data from the vehicle.

In some embodiments, the causing a display of information associated with a feature application program may include an image stream received from a camera.

In some embodiments, the program instructions may be further executable by the processing unit for the receiving, the scanning, the generating and the transmitting to be repeated periodically.

BRIEF DESCRIPTION OF THE DRAWINGS

The invention will be better understood by way of the following detailed description of embodiments of the invention with reference to the appended drawings, in which.

DETAILED DESCRIPTION

Figure 1:
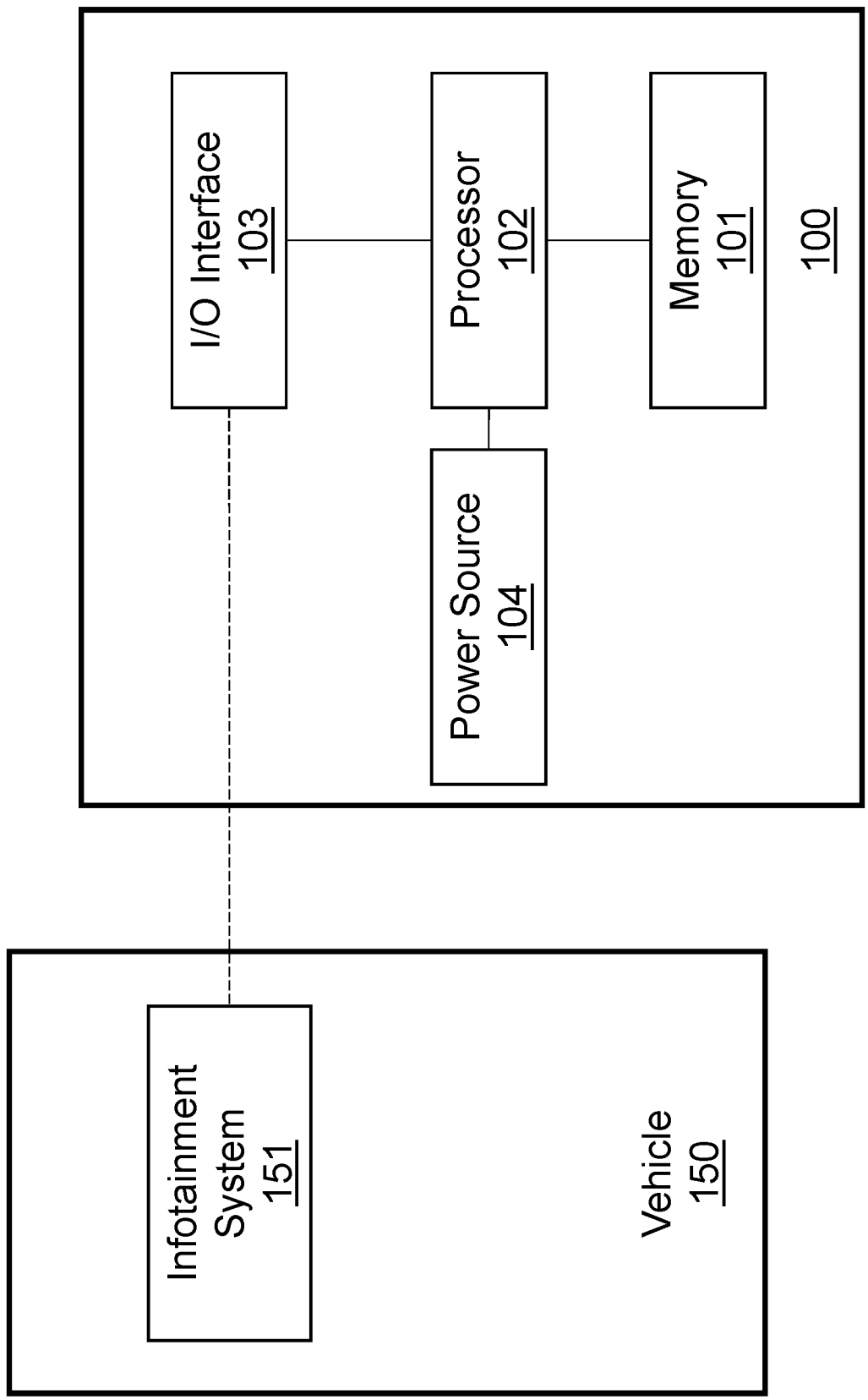
FIG. 1 is a block diagram of an exemplary device for introducing new features to an infotainment system in communication with an exemplary infotainment system of an exemplary vehicle.

The present disclosure relates to methods, devices and systems for introducing new features to an in-vehicle infotainment system of a vehicle, thereby enhancing the functionality of the infotainment system.

The methods and systems of the present disclosure leverage an Android™ protocol, as developed by Google™, to communicate with an infotainment system running an Android-based smartphone infotainment application program, such as Android Auto™.

An Android device or Linux device is provided with memory storing program code of an application program for causing a display (e.g. through mirroring) or running of the desired features on the infotainment system, the Android or Linux device communicating with the infotainment system using the Android™ protocol.

In order to communicate with the infotainment system running an Android-based smartphone infotainment application program using an Android™ protocol, a version (e.g. a recent version) of the Android-based smartphone infotainment application program to scanned to extract a base certificate therefrom. The base certificate is used to generate a certificate-key pair for authentication and encryption, for establishing communication between the Android or Linux device and the infotainment system with an Android protocol. More particularly, the private key of the certificate-key pair is generated from the base certificate, where the certificate, including the public key and signature or identifier, may be extracted or derived from the program code of the Android-based smartphone infotainment application program.

As a result, the Android or Linux device can communicate with the infotainment system, and transmit to the infotainment system data (e.g. an image stream, for instance, via mirroring) of the feature application program, stored in the memory of the Android or Linux device, for causing infotainment system to display information, play sound, etc., corresponding to the feature application program. This communication of data related to the feature application program to the infotainment system results in the infotainment system gaining the functionality associated with the feature application program. As a result, the added functionality is dependent and can be adapted depending on the nature of the feature application program. In some instances, the feature application program may also receive data from one or more external hardware devices, such as a data-bus that is in communication with the vehicle, receiving readings or metrics (e.g. speed, tire pressure, etc.) from the vehicle, or an external camera, a carbon dioxide reader, etc. This information, transmitted to the feature application program, can be processed by the processor of the Android or Linux device running the feature application program, and transmitted to the infotainment system for display of same. As a result, the methods and systems of the present disclosure may also enable integration of one or more after-market external hardware device(s) that can indirectly interact with the infotainment system, even when the software developer of the Android-based smartphone infotainment application program would not provide support for this functionality in their system or application program, through the Android or Linux device for adding new features to the infotainment system.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

From the foregoing it will be appreciated that, although specific embodiments have been described herein for purposes of illustration, various modifications may be made without deviating from the spirit and scope of the teachings. Accordingly, the claims are not limited by the disclosed embodiments.

DEFINITIONS

In the present disclosure, by "adding features", it is meant adding a functionality to the infotainment system, in order to increase the utility of the infotainment system. A feature may be the running of an application program that was not previously supported by the infotainment system, or by the Android-based smartphone infotainment application program, due to limitations imposed or permissions required by the Android-based smartphone infotainment application program or its software developer. A feature may be a display of metrics or data generated by one or more after-market external hardware devices that have been joined to or integrated to the vehicle (such as a camera, a data-bus to receive metric or readings from the vehicle, etc.)

In the present disclosure, by "Android-based smartphone infotainment application program", it is meant a mobile application program configured to mirror certain features available on an Android or Linux device (e.g. a smartphone, a tablet) on the in-vehicle's infotainment system (e.g. its display or dashboard). The Android-based smartphone infotainment application program permits certain application programs to be mirrored on the display of the infotainment system (e.g. following a pairing between the Android device and the infotainment system of the vehicle). An exemplary Android-based smartphone infotainment application program is Android Auto™. However, the Android-based smartphone infotainment application program limits the application programs that are usable through the Android-based smartphone infotainment application program on the infotainment system to supported application programs, which can impair the flexibility of the infotainment system running the Android-based smartphone infotainment application program by excluding non-supported application programs. The infotainment system acts, as a result of the Android-based smartphone infotainment application program, as an external display for the Android device connected thereto.

In the present disclosure, by "Android certificate" or "Androit protocol certificate", it is meant an identity certificate for the Android-based smartphone infotainment application program that is used to confirm that another principal, and the key provided therefrom, is that of another authorized principal. As such, the Android certificate is used for purposes of authentication when establishing an Android protocol with another Android computing device.

In the present disclosure, by "Android protocol", it is meant the structure used by Google to serialize structured data, a set of rules or procedures for transmitting data between Android devices, or devices running an Android application program.

In the present disclosure, by "base certificate", it is meant a registered certificate which can be used to generate another certificate that is used as an identification of an Android device, communication with a device or system running Android Auto™, and a private key which is used for securing the communication channel.

In the present disclosure, by "feature application program", it is meant an application program that is to provide additional functionality or features to the infotainment system through the use of the computing device for introducing new features to the infotainment system. The feature application program may be to cause a display of a game on the display of the in-vehicle infotainment system, a virtual map (e.g. one that is unsupported by Google™), for displaying information or data generated by or derived from an external hardware device, etc.

In the present disclosure, by "in-vehicle infotainment system" or infotainment system, it is meant a system that is part of the vehicle that is designed to deliver information and entertainment to the occupants of the vehicle (the driver and/or the passengers), through the use and combination of displays, buttons, touchscreen displays, audio and video input/output interfaces. Moreover, when running an Android-based smartphone infotainment application program, the infotainment system may also mirror Android application programs found on the Android device of the user.

In the present disclosure, by "vehicle", it is meant a motorized object used for transporting people or goods, especially on land or on water, and includes, but is not limited to, a car, a truck, a tractor, a motorboat, etc.

Exemplary System for Introducing Features to an Infotainment System of a Vehicle:

Reference is now made to FIG. 1, illustrating an exemplary system for introducing features to an infotainment system of a vehicle. The system includes the device 100 for introducing the features to the infotainment system 151, and the in-vehicle infotainment system 151 of the vehicle 150.

The infotainment system 151 is an in-vehicle infotainment system as is known in the art. For instance, the infotainment system may include software and hardware in the vehicle 150 for providing audio or video entertainment, enable communication of the user by facilitating calls and texting, and/or providing the user with information on the vehicle (e.g. through the use of a camera, such as a back-up camera, metrics on the vehicle such as tire pressure and a fill-ratio of the gas tank, etc.). The infotainment system 151 may also pair with the user's smartphone, to display content of the smartphone on the infotainment system (e.g. by using an Android-based smartphone infotainment application program, such as Android Auto™). Further features may include audio controls for driving the vehicle, handsfree voice controls, touch-sensitive buttons, touch screens, etc. It will be understood that the features available on an in-vehicle infotainment system may continue to evolve as vehicles provide more driving-support to the user of driver (e.g. self-driving vehicle), allowing the user or driver to pass more time focusing on entertainment during the travel time passed in the vehicle 150.

The computing device 100 is an Android device or a Linux device, configured to run an Android protocol.

The device 100 has at least one processor 102, memory 101 and at least one input/output interface 103 for communication with the infotainment system 151 of the vehicle 150. The device 100 includes a power source inlet 104.

The processor 102 may be a general-purpose programmable processor. In this example, the processor 102 is shown as being unitary, but the processor 102 may also be multicore, or distributed (e.g. a multi-processor).

The computer readable memory 101 stores program instructions and data used by the processor 102. The computer readable memory 101 may also store one or more feature application programs, base certificates, the Android-based smartphone infotainment application program for scanning, a certificate-key pair, data from external hardware, etc. The memory 101 may be non-transitory. The computer readable memory 101, though shown as unitary for simplicity in the present example, may comprise multiple memory modules and/or caching. In particular, it may comprise several layers of memory such as a hard drive, external drive (e.g. SD card storage) or the like and a faster and smaller RAM module. The RAM module may store data and/or program code currently being, recently being or soon to be processed by the processor 102 as well as cache data and/or program code from a hard drive. A hard drive may store program code and be accessed to retrieve such code for execution by the processor 102 and may be accessed by the processor 102 to store and access data. The memory 101 may have a recycling architecture for storing, for instance, certificate-key pairs, data related to one or more feature application programs, where older data files are deleted when the memory 101 is full or near being full, or after the older data files have been stored in memory 101 for a certain time.

The I/O interface 103 is in communication with the processor 102. The I/O interface 103 may include a network interface and may be a wired or wireless interface for establishing a remote connection with the infotainment system. For instance, the I/O interface 103 may be an Ethernet port, a WAN port, a TCP port, a USD port, etc. In some instances, the I/O interface 103 may also connect with a user's smartphone or external server to receive update information or configurations from the remote server or the user's smartphone.

For instance, the user's smartphone may include a client application program providing a graphical user interface for configuring the device 100, such as the feature application program that is running, downloading a new feature application program, turning on or off the device 100, configuring the feature application program, etc.

As such, the user's smartphone (or computing device, such as a tablet) may be in communication with the I/O interface 103 of the device 100. The user's smartphone has a processor, a memory, an I/O interface that may be linked via bus connections. The user's smartphone may have (or be connect to) any suitable I/O device(s), for example, such as a keyboard, a mouse, a touchscreen etc. Even though, for purposes of illustration, reference is made to a user's smartphone, it will be understood that any other computing device to communicate with the device 100 may be used, such as a desktop computer, a laptop, a tablet computer, etc.

The processor 102, the memory 101 and the I/O interfaces 103 may be linked via bus connections.

The power source inlet 104 may be configured to draw power from the vehicle. In some instances, the power source inlet 104 may be configured to draw power from a battery, where the battery may be included in the device 100. The battery may be rechargeable.

In some instances, the device 100 may include, may be connectable to, or may communicate with, one or more external hardware devices. The one or more external hardware devices may include one or more cameras (e.g. joinable to an outside of the vehicle, such as a rear-camera, a front camera, etc.) The one or more external hardware devices may include a data-port or data-bus for receiving metrics or readings from the vehicle. The one or more external hardware devices may include a microphone. It will be understood that the one or more external hardware devices may include any sensor, device or other for collecting or generating data for use with or display on the infotainment system 151.

Figure 2:
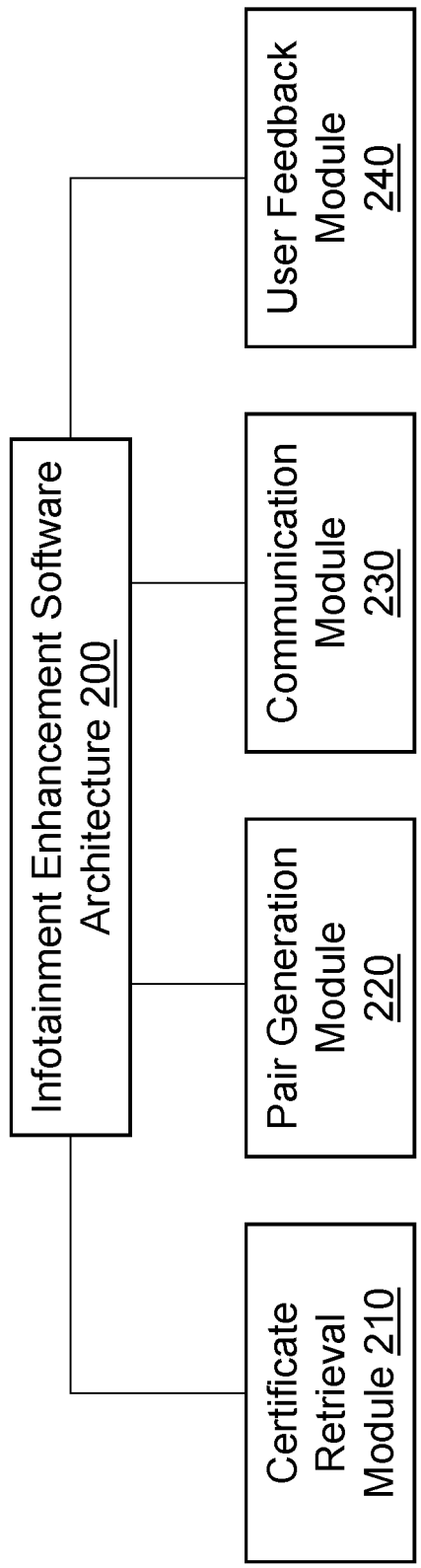
FIG. 2 is a block diagram of exemplary software architecture of an infotainment enhancement software for introducing new features to an infotainment system.

Exemplary Software Architecture for Introducing New Features to an Infotainment System:

Reference is now made to FIG. 2, illustrating an exemplary software architecture 200 of the device 100 for introducing new features to an infotainment system.

The device 100 has program code, stored in memory 101, that includes a certificate retrieval module 210. The device 100 has program code, stored in memory 101, that includes a pair generation module 220. The device 100 has program code, stored in memory 101, that includes a communication module 230. The device 100 has program code, stored in memory 101, that includes a user feedback module 240. Each of the certificate retrieval module 210, the pair generation module 220, communication module 230 and user feedback module 240 includes program code configured to implement the functionality of the modules as is described herein.

The certificate retrieval module 210 includes program code stored in memory 101 that, when executed by the processor 102, causes the processor 102 to receive an Android-based smartphone infotainment application program and scan the Android-based smartphone infotainment application program for a base certificate. The certificate retrieval module 210 may receive the Android-based smartphone infotainment application program by downloading the Android-based smartphone infotainment application program (e.g. from application program store or database). The certificate retrieval module 210 then causes the processor 102 to scan the program code of the Android-based smartphone infotainment application program with a specific pattern for locating the base certificate. The base certificate is then retrieved or extracted.

The pair generation module 220 includes program code stored in memory 101 that, when executed by the processor 102, causes the processor 102 to receive the retrieved based certificate from the certificate retrieval module 210, and to generate a key-certificate pair from the base certificate. The private key of the certificate-key pair is generated by performing a series of calculations on the base certificate. The certificate (including a public key and signature) of the certificate-key pair may be derived or extracted from the program code of the Android-based smartphone infotainment application program.

The communication module 230 includes program code stored in memory 101 that, when executed by the processor 102, causes the processor 102 to perform a handshake with the infotainment system 151 through the I/O interface 103. The communication module 230 causes the processor 102 to transmit the certificate of the certificate-key pair to the infotainment system 100 to identify the device 100. The private key of the certificate-key pair is used to decrypt communications received from the infotainment system 151 (private key). The public key of the Android protocol certificate of the certificate-key pair is used to encrypt the information transmitted to the infotainment system 151 (public key) from the device 100. Therefore, the certificate also includes a public key to encrypt communications transmitted to the infotainment system 151 from the device 100. Once handshaking between the device 100 and the infotainment system 151 is complete, the communication module 230 causes the processor to transmit data to the infotainment system 151, the transmitted data associated with the feature application program stored in memory 101 of the device 100. The transmitted data may be an image stream, an audio stream, certain input or display commands, configuration data to layout the information to be displayed on the infotainment system, etc. As a result, the infotainment system 151 displays or shares information (e.g. a graphical user interface) associated with the feature application program.

In some instances, where multiple feature application programs are stored in memory 101, the communication module 230 may further include program code that causes the processor 102 to receive user input received at the infotainment system 151, via the I/O interface 103. The communication module 230 may decrypt the input received from the infotainment system 151. The received input includes information associated with a selection of one of the multiple feature application programs. For instance, the user input may include, or may be accompanied by, position information (e.g. coordinates, x,y location) on the display associated with the touch of the user. The communication module 230 may then compare the received position information with stored position coordinates associated with each of the multiple feature application programs. A selection command may be generated for the feature application program of the multiple feature application programs with position information matching or closest to (e.g. with a set tolerance) to the position information of the user input.

In some embodiments, the device 100 may include a user input interface (e.g. one or more buttons, a touchscreen, a microphone, etc.), and the user input (e.g. for selecting one of a plurality of feature application programs) may be inputted via the user input interface of the device 100, the device 100 receiving the user input received at the user input interface of the device 100.

In some embodiments, when the device 100 includes, or is in communication with, one or more external hardware devices (such as a camera, a databus connected to the vehicle, etc.), the communication module 230 may also include program code to cause the processor 102 to receive the data from the one or more external hardware devices, the received data then processed by a feature application program (e.g. stored in memory 101) associated with the one or more external hardware devices.

In some instances, the infotainment enhancement software architecture 200 may include a user feedback module 240. The user feedback module 240 includes program code stored in memory 101 that, when executed by the processor 102, causes the processor 102 to receive commands to configure the device 100 through the I/O interface 103. The commands may include data for a new feature application program to be stored in memory 101. The commands may include a command to delete a feature application program stored in memory 101. The commands may include one or more configurations for a feature application program stored in memory 101 (e.g. changing the layout of the feature application program on the infotainment system 151, selecting one or more options or permissions for the feature application program, etc.) The commands may also include a command for turning on or off the device 100.

In some instances, the user feedback module 240 may receive, via the I/O interface 103, input from an external computing device (e.g. a smartphone, a tablet, a laptop, etc.), where the external computing device acts as an external user interface for the device 100. The external computing device may run a client application program of the device 100 for configuring the device 100, and/or for selecting, using and/or configuring (selecting features, deleting or downloading a feature application program, etc.) the one or more feature application programs stored in memory 101 of the device 100.

Figure 3:
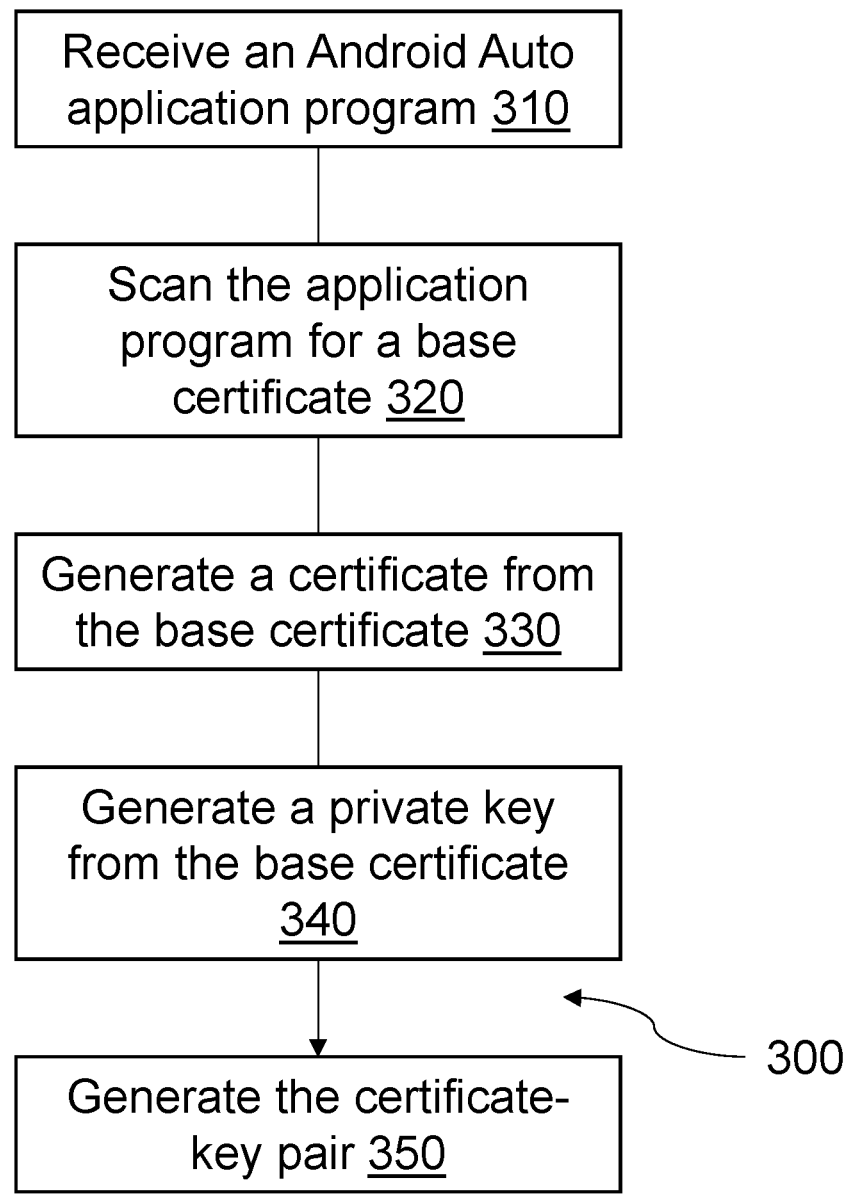
FIG. 3 is a flowchart diagram of an exemplary method for generating a certificate-key pair for communicating with an infotainment system of a vehicle.

Exemplary Method for Establishing Communication with an in-Vehicle Infotainment System:

Reference is now made to FIG. 3, illustrating an exemplary method 300 of establishing communication between a computing device for introducing new features to an in-vehicle infotainment system, and the infotainment system. The method 300 may be performed by the computing device 100, or any other computing device for introducing new features to an infotainment system in accordance with the present teachings.

An Android-based smartphone infotainment application program is received at the computing device for introducing new features to the infotainment system at step 310. The Android-based smartphone infotainment application program may be Android Auto™. The received Android-based smartphone infotainment application program may be the latest version of the Android-based smartphone infotainment application program, in order to improve the possibility that the data extracted from the Android-based smartphone infotainment application program is current.

In some instances, the Android-based smartphone infotainment application program may be downloaded by the computing device introducing new features to the infotainment system. In some instances, the Android-based smartphone infotainment application program may be downloaded by an external server and transmitted to the computing device introducing new features to the infotainment system.

The program code of the Android-based smartphone infotainment application program is scanned to locate a base certificate, present in the program code of the Android-based smartphone infotainment application program at step 320. The scanning is performed using a pattern of data that is adapted for the kind of Android-based smartphone infotainment application program to be scanned. For instance, the pattern is one or more string of characters found in the program code of the Android-based smartphone infotainment application program indicative of the location of the base certificate. The pattern is a pattern of code that is characteristic of or related to the base certificate. It will be understood that the specific pattern defined for performing the scan depends upon the Android-based smartphone infotainment application program that is to be scanned, and this pattern may vary as the Android-based smartphone infotainment application program is updated or a new version of the Android-based smartphone infotainment application program is released. For instance, in the case of Android Auto™, the program code Android Auto™ may be parsed to locate the string of characters "BEGIN CERTIFICATE" and locate one that is in a "return" function, where the string of characters following "BEGIN CERTIFICATE" is the base certificate.

An Android protocol certificate may be generated from the base certificate or further extracted from the program code of the Android-based smartphone infotainment application program at step 330. In some embodiments, the Android-based smartphone infotainment application program may be further searched for a pattern or motif that is indicative of the location of the Android protocol certificate. In other embodiments, the Android protocol certificate may be generated or derived from the base certificate, by performing a series of transformations or calculations on the base certificate to obtain the Android protocol certificate. The Android protocol certificate is used as credentials to establish communication between the computing device for introducing features to the infotainment system, and the infotainment system. The Android protocol certificate authenticates the computing device for introducing features to the infotainment system, at the infotainment system. The Android protocol certificate includes the public key and the identifying signature. The public key is used to encrypt data transmitted from the device for introducing features to the infotainment system to the infotainment system.

As such, in some embodiments, the Android protocol certificate may be generated by performing one or more calculations, applying one or more functions, to the base certificate. It will be understood that the nature of the calculation(s) and function(s) applied to the base certificate may depend on the nature of the Android protocol, the identity of the Android-based smartphone infotainment application program, etc. For instance, the generating of the Android protocol certificate from the base certificate may involve.

A key pair is generated from the base certificate at step 340. The private key is used to decrypt, at the device for introducing features to the infotainment system, data received from the infotainment system. The private key is generated from the base certificate by applying a series of operations that may depend upon the nature of the Android-based smartphone infotainment application program, the version of the Android-based smartphone infotainment application program, the nature of the Android device, and so forth. As such, it will be understood that the nature of the operations performed or algorithm used to obtain the private key from the base certificate depends on these factors, such as the nature of the Android-based smartphone infotainment application program, the version of the Android-based smartphone infotainment application program, the nature of the Android device, and so forth. In one example, the private key may be obtained from the base certificate by first analyzing the structure of the program code of the Android-based smartphone infotainment application program and/or of the base certificate, indicative of a structure or characteristics of the private key. Once a certain structure or characteristics of the Android-based smartphone infotainment application program and/or of the base certificate are identified, narrowing down the possible private key formulations, simulations or iterative testing of the possible private keys are performed until the appropriate private key is identified (e.g. by testing its capacity to decrypt incoming communications from an Android device running the Android-based smartphone infotainment application program).

The generated Android protocol certificate (with the public key and the signature) and the private key result in a certificate-key pair at step 350.

The certificate-key pair is used to establish communication (through a handshake) between the infotainment system and the device for introducing features to the infotainment system running the Android-based smartphone infotainment application program. Following a ping or prompt sent by the infotainment system running the Android-based smartphone infotainment application program to the device for introducing features to the infotainment system, the Android protocol certificate (including the public key and the signature) of the certificate-key pair is transmitted from the device for introducing features to the infotainment system, to the infotainment system to authenticate the device for introducing features to the infotainment system. The private key of the certificate-key pair is used to decrypt communications received from the infotainment system. The public key of the certificate-key pair is used to encrypt communications transmitted from the device for introducing new features to the infotainment system, to the infotainment system. A communication channel based on the Android protocol is thereby established between the device for introducing features to the infotainment system, that is an Android device or Linux device, and the infotainment system.

In some examples, method 300 may be performed periodically to retrieve a current instance of the base certificate, as the Android-based smartphone infotainment application program is updated, resulting in a new base certificate. The corresponding certificate-key pair is generated accordingly, as described herein, from the newly retrieved base certificate.

Figure 4:
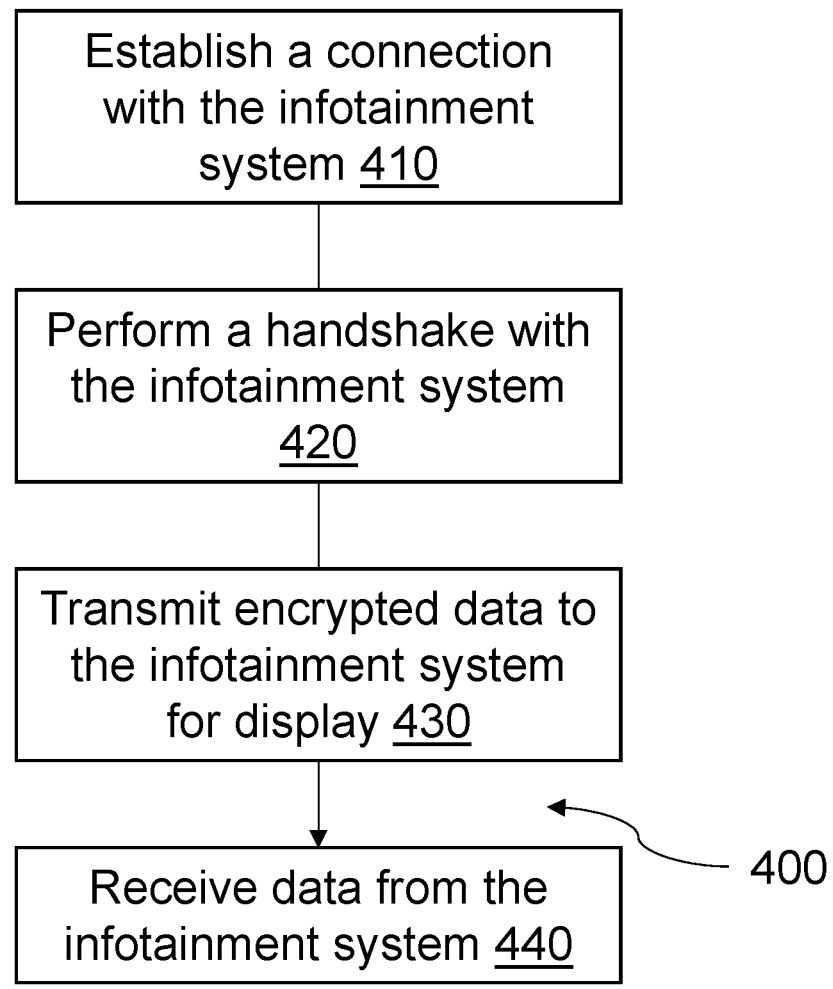
FIG. 4 is a flowchart diagram of an exemplary method for introducing new features to an infotainment system of a vehicle once the certificate-key pair has been generated.

Exemplary Method for Introducing New Features to the Infotainment System:

Reference is now made to FIG. 4, illustrating an exemplary method 400 for introducing new feature(s) to an in-vehicle infotainment system. The method 400 may be performed by the computing device 100, or any other computing device for introducing new features to an infotainment system in accordance with the present teachings.

A wired connection (in some instances, a wireless connection) is established between the device for introducing new features to an infotainment system, and the infotainment system at step 410. In one example, the connection may be established by wiring the device for introducing new features to an infotainment system, to the infotainment system (e.g. via a USB connection). In one example, the connection may be established by turning on the device (e.g. by pressing a button or receiving specific user input for turning on the computing device) for introducing new features to an infotainment system or turning on the vehicle with the infotainment system. In one example, the connection may be established by powering the device for introducing new features to an infotainment system, and/or by powering the infotainment system (e.g. turning on the vehicle).

Credentials between the device for introducing new features to an infotainment system, and the infotainment system, are verified by performing a handshake between the device for introducing new features to an infotainment system, and the infotainment system at step 420.

The certificate-key pair generated by performing method 300 is used to perform the handshake between the infotainment system and the device for introducing features to the infotainment system running the Android-based smartphone infotainment application program. For instance, following a ping or prompt sent by the infotainment system running the Android-based smartphone infotainment application program to the device for introducing features to the infotainment system, the Android protocol certificate of the certificate-key pair is transmitted from the device for introducing features to the infotainment system to the infotainment system to authenticate the device for introducing features to the infotainment system. Following receipt and verification of credentials by the infotainment system of the Android protocol certificate, an authenticated channel of communication, with an Android protocol, is established between the device for introducing features to the infotainment system, that is an Android device or Linux device, and the infotainment system.

With the channel of communication, based on the Android protocol, established between the device for introducing features to the infotainment system and the infotainment system, encrypted data (encrypted using the public key of the Android protocol certificate of the certificate-key pair) is transmitted from the device for introducing features to the infotainment system and the infotainment system at step 430. The device for introducing features to the infotainment system may encrypt, using the public key of the Android protocol certificate, the data transmitted over the Android-protocol-based connection to the infotainment system.

For instance, the data transmitted by the device for introducing features to the infotainment system may be an image stream of the feature application program, the functionality of the feature application program to be made available for viewing or use on the infotainment system. The image stream may be that of a graphical user interface of the feature application program (i.e. mirroring the contents of the Android device or Linux device for introducing new features to the infotainment system). When the feature application program is to display an image stream produced by a hardware device that is a camera, the image stream is that or may include the video generated by the camera.

In an example where the feature application program receives metric data from a data-bus that receives metrics or readings from the vehicle (e.g. speed, tire pressure, internal temperature, carbon dioxide readings, tire alignment, etc.), the metrics or readings from the vehicle may be processed by the feature application program, and the image stream transmitted from the device for introducing features to the infotainment system may be for generating on a display of the infotainment system a graphical user interface displaying the readings or metrics from the vehicle, or information that has been derived from the metrics or readings from the vehicle.

Data may also be received from the infotainment system at the device for introducing features to the infotainment system at step 440. The data transmitted by the infotainment system may be encrypted. The private key of the certificate-key pair is used to decrypt communications received from the infotainment system at the device for introducing features to the infotainment system.

The data transmitted from the infotainment system to the device for introducing features to the infotainment system may include user input (e.g. touchscreen input) received at the infotainment system. For instance, the user input received on a touchscreen of the infotainment system may include position information (e.g. defined as x, y coordinates) as to where the user input was received on the touchscreen. The position information, received at the device for introducing features to the infotainment system, may be processed to determine what action to perform as a function of the user input. The position information may be compared to data on a layout of a graphical user interface of the feature application program, displayed on the infotainment system, where selection at a specific position of the graphical user interface causes an action, as determined by the program code of the corresponding feature application program.

The user input received at the infotainment system may also be associated with selecting one of a plurality of feature application programs. Position information of the user input generated at the infotainment system, received at the device for introducing features to the infotainment system, can be associated with a feature application program of a plurality of feature application programs, by comparing the received position information with a position of, e.g., an icon for each of the plurality of feature application programs, as stored in memory of the device for introducing features to the infotainment system. This comparison enables a determination of the feature application program, amongst the plurality of feature application programs, that has been selected by the user based on the user's input received at the infotainment system.

As such, it will be understood that the in-vehicle infotainment system can adopt a new functionality that is implemented by the feature application program, as the data received at the infotainment system, sent by the device for introducing features to the infotainment system, will be related to the feature application program (e.g. an image stream of the feature application program). If the feature application program is compatible with an external hardware device, data related to the external hardware device will be presentable through the infotainment system, as a result of the device for introducing features to the infotainment system, even if the infotainment system, or the an Android-based smartphone infotainment application program running on the infotainment system, does not initially support or provide compatibility between the external hardware device and the infotainment system, or the Android-based smartphone infotainment application program running on the infotainment system.

Furthermore, if the infotainment system, or the Android-based smartphone infotainment application program running on the infotainment system of the original equipment manufacturer (OEM), fails to provide a given functionality, the shortcoming of the infotainment system, or the an Android-based smartphone infotainment application program running on the infotainment system can be remedied by having the device for introducing features to the infotainment system provide that functionality to the infotainment system.

Example 1: 360-View Image of the Vehicle

Figure 5:
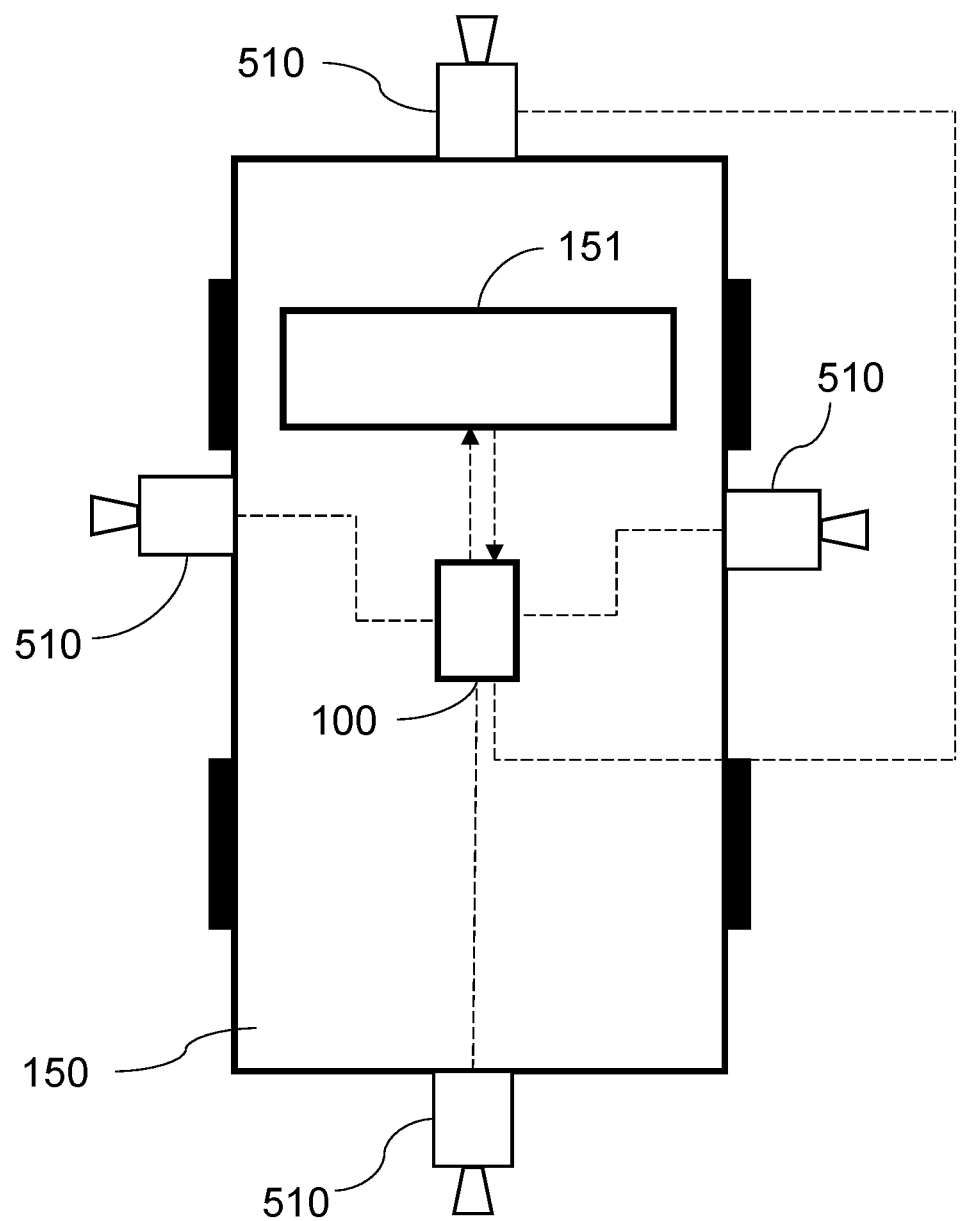
FIG. 5 is a simplified diagram of an exemplary device for introducing new features to an infotainment system with exemplary after-market cameras mounted to a vehicle. The items illustrated at FIG. 5 are for illustrative purposes and are not to scale.

With reference to FIG. 5, the following example is an illustration of the teachings of the present disclosure. It will be understood that this is but an example, and that other possible uses or examples may be achieved in accordance with the present teachings.

For this example, the exemplary vehicle 150 with an infotainment system 151 does not provide an original-equipment manufacturer (OEM) 360-view camera functionality, to generate a bird's eye 360 view of the vehicle.

The feature application program stored in memory 101 of the device for introducing new features to the infotainment system 100 includes program code to cause the processor to generate a 360-view image of the vehicle from a series of cameras 510.

In this example, four after-market cameras 510 are mounted to the vehicle 150 (a front camera, one camera on each side of the car, a rear camera). These external hardware devices 510 are configured to transmit their respective image streams to the device 100. The feature application program causes the processor 102 to process the image streams to generate the 360-view image, the technique to generate the 360-view image from the cameras as is known in the art.

The device 100 generates the certificate-key pair from the base certificate extracted from the received Android-based smartphone infotainment application program, as explained herein. The device 100 performs the handshake with the infotainment system 151, and a communication channel with an Android protocol is established between the device 100 and the infotainment system 151.

The device 100 transmits via the communication channel an image stream corresponding to the 360-view image of the vehicle 150 generated by the feature application program to the infotainment system, the 360-view image stream to be display as part of a feature application program to be mirrored on the infotainment system 151. The infotainment system 151 displays on its display the image corresponding to the received image stream, laid out on the display of the infotainment system 151 in accordance with the received image stream.

The infotainment system 151 of the vehicle 150 can now provide a 360-view image stream of the vehicle to the driver, when needed.

Example 2: Game Feature

The following example is another illustration of the teachings of the present disclosure. It will be understood that this is but an example, and that other possible uses or examples may be achieved in accordance with the present teachings.

The present example illustrates adding a gaming functionality to the infotainment system, such as TETRIS™.

The device 100 generates the certificate-key pair from the base certificate extracted from the received Android-based smartphone infotainment application program, as explained herein. The device performs the handshake with the infotainment system, and a communication channel with an Android protocol is established between the device 100 and the infotainment system.

The feature application program stored in memory 101 of device 100 is that of the game of TETRIS™.

With the communication channel with an Android Protocol established between the infotainment system and the device 100, the device 100 transmits to the infotainment system an image stream corresponding to a graphical user interface of the game TETRIS™, with the blocks moving between frames of the image stream, the feature application program mirrored on the infotainment system.

The user plays the game by providing user input on the touchscreen of the infotainment system, displaying the graphical user interface of the game TETRIS™.

The user input received at the infotainment system is sent to the device 100, the user input first received at the infotainment system corresponding to actions taken by the user while playing the game. The user input includes position information of where the user input is received on the touchscreen. The user input can then be mapped out to the graphical user interface, and objects (e.g. blocks) generated on the graphical user interface corresponding to the game with specific positions defined with respect to the graphical user interface. Appropriate actions, in accordance with the instructions of the game, can be generated to advance the game, in accordance with the received user input. The image stream that is generated by the device 100 and transmitted to the infotainment system corresponds to the game as it advances, per the execution of the program code of the feature application program in accordance with the received user input.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. An Android- or Linux-based computing device for introducing features to an in-vehicle infotainment system of a vehicle, the introduced features accessible by a user on the infotainment system, comprising:
   an input/output interface for communicating with the in-vehicle infotainment system;
   a power source input; a
   processor; and
   memory storing program code that, when executed by the processor, causes the processor to:
   receive an Android-based smartphone infotainment application program; scan
   program code of the Android-based smartphone infotainment application program using a predefined pattern to locate a base certificate in the program code of the Android-based smartphone infotainment application program;
   generate a certificate-key pair from the base certificate;
   transmit a certificate of the certificate-key pair to the infotainment system for authentication and to establish communication with an Android protocol between the computing device and the infotainment system;
   cause a display of information associated with a first feature application program for display on the infotainment system,
   receive, via the input/output interface, touch input position information received on a display of the infotainment system; and
   correlate the received touch input position information with one of:
      target position information of the first feature application program; and
      target position information of a second feature application program,
   to identify a selected feature application program,
   wherein the causing a display of information is of the selected feature application program.

2. The computing device as defined in claim 1, wherein the input/output interface establishes a wired connection with the in-vehicle infotainment system.

3. The computing device as defined in claim 2, wherein the input/output interface is a USB port.

4. The computing device as defined in claim 1, wherein the power source input is configured to receive power from the vehicle.

5. The computing device as defined in claim 1, further comprising a power source that is a battery, wherein the power source input receives power from the battery.

6. The computing device as defined in claim 1, wherein the memory further stores program code for causing the processor to run the feature application program that is a videogame.

7. The computing device as defined in claim 1, further comprising a data port configured to receive data from the vehicle, wherein the causing a display of information associated with a feature application program is related to the received data from the vehicle.

8. The computing device as defined in claim 1, further comprising a camera, wherein the causing a display of information associated with a feature application program comprises an image stream received from the camera.

9. The computing device as defined in claim 1, wherein the program code further causes the processor, when executing the program code, to cause the receiving, scanning, generating and transmitting to be repeated periodically.

10. The computing device as defined in claim 1, further comprising a user input interface.

11. A method of introducing features to an in-vehicle infotainment system of a vehicle, the introduced features accessible by a user on the infotainment system, comprising:
   receiving an Android-based smartphone infotainment application program;
   scanning program code of the Android-based smartphone infotainment application program using a predefined pattern to locate a base certificate in the program code of the Android-based smartphone infotainment application program;
   generating a certificate-key pair from the Android certificate;
   transmitting a certificate of the certificate-key pair to the infotainment system for authentication and to establish communication with an Android protocol between the computing device and the infotainment system;
   causing a display of information associated with a first feature application program for display on the infotainment system,
   receiving, via the input/output interface, touch input position information received on a display of the infotainment system; and
   correlating the received touch input position information with one of:
      target position information of the first feature application program; and
      target position information of a second feature application program,
   to identify a selected feature application program,
   wherein the causing a display of information is of the selected feature application program.

12. The method as defined in claim 11, wherein the feature application program is a videogame.

13. The method as defined in claim 11, wherein the causing a display of information associated with a feature application program is related to received data from the vehicle.

14. The method as defined in claim 11, wherein the causing a display of information associated with a feature application program comprises an image stream received from a camera.

15. The method as defined in claim 11, wherein the receiving, the scanning, the generating and the transmitting are repeated periodically.

16. A non-transitory computer-readable medium having stored thereon program instructions for introducing features to an in-vehicle infotainment system of a vehicle, the introduced features accessible by a user on the infotainment system, the program instructions executable by a processing unit for:
   receiving an Android-based smartphone infotainment application program;
   scanning program code of the Android-based smartphone infotainment application program using a predefined pattern to locate an Android certificate in the program code of the Android-based smartphone infotainment application program;

generating a certificate-key pair from the base certificate;

transmitting a certificate of the certificate-key pair to the infotainment system for authentication and to establish communication with an Android protocol between the computing device and the infotainment system;

causing a display of information associated with a first feature application program for display on the infotainment system, receiving, via the input/output interface, touch input position information received on a display of the infotainment system; and correlating the received touch input position information with one of:

target position information of the first feature application program; and target position information of a second feature application program, to identify a selected feature application program, wherein the causing a display of information is of the selected feature application program.

17. The non-transitory computer-readable medium as defined in claim 16, wherein the program instructions are further executable by the processing unit for running the feature application program that is a videogame.

* * * * *